(12) United States Patent
Díaz Ariza

(10) Patent No.: US 11,001,536 B2
(45) Date of Patent: May 11, 2021

(54) BIOINOCULANT COMPOSITION

(71) Applicant: Pontificia Universidad Javeriana, Bogotá (CO)

(72) Inventor: Lucia Ana Díaz Ariza, Bogotá (CO)

(73) Assignee: PONTIFICIA UNIVERSIDAD JAVERIANA, Bogota (CO)

( * ) Notice: Subject to any disclaimer, the term of this patent is extended or adjusted under 35 U.S.C. 154(b) by 10 days.

(21) Appl. No.: 16/296,786

(22) Filed: Mar. 8, 2019

(65) Prior Publication Data

US 2020/0283347 A1    Sep. 10, 2020

(51) Int. Cl.
*C05F 11/08*  (2006.01)
*C05F 5/00*  (2006.01)

(52) U.S. Cl.
CPC .............. *C05F 11/08* (2013.01); *C05F 5/002* (2013.01)

(58) Field of Classification Search
None
See application file for complete search history.

(56) References Cited

U.S. PATENT DOCUMENTS

2014/0283569 A1* 9/2014 Doty .................... C12N 9/0006 71/11
2019/0039964 A1* 2/2019 Temme .................. C12N 15/70

FOREIGN PATENT DOCUMENTS

WO    2014167409 A1    10/2014
WO    2015089183 A3    10/2015

OTHER PUBLICATIONS

Farmorganix, StandUp, and Sumagrow: https://99designs.com.co/product-label-design/contests/help-create-label-natural-bio-fertilizer-company-287634.
Narvaez-Cuenca, Carlos Eduardo, "Hydroxycinnamoyl conjugates in potato tubers. Diversity and reactivity upon processing" PhD Thesis, Wageningen University. Wageningen, The Netherlands (2013).
Pardo, Oscar Hernando et al, "Caracterización estructural y térmica de almidones provenientes de diferentes variedades de papa" Acta Agronórnica vol. 62, No. 4, 2013.
Stefan Martyniuk* and Jadwiga Oron, "Use of Potato Extract Broth for Culturing Root-Nodule Bacteria" Polish Journal of Microbiology, 2011, vol. 60, No. 4, 323-327.

* cited by examiner

*Primary Examiner* — Wayne A Langel
(74) *Attorney, Agent, or Firm* — The Morales Law Firm; Joseph L. Morales

(57)    ABSTRACT

The present invention relates to a biostimulant and biofertilizer bioinoculant composition in a *Solanum tuberosum*-based medium, which comprises microorganisms that produce siderophores and indole derivatives, solubilize phosphorus and fix atmospheric nitrogen. Said composition further comprises one or more indole derivatives and includes at least one additional carbon source. It is also disclosed a method for producing said composition. The composition of the present invention provides an alternative to chemical fertilization of crops, promotes plant growth by maintaining stable cell counts after its application to a substrate or to plant material and has extended shelf life.

20 Claims, 5 Drawing Sheets

BIOINOCULANT COMPOSITION

FIELD OF THE INVENTION

The present invention relates to a biostimulant and biofertilizer bioinoculant composition used in agricultural production. Particularly, the invention discloses a composition in a *Solanum tuberosum*-based biodegradable medium, which comprises microorganisms that promote plant growth, as well as the method for producing the same.

BACKGROUND OF THE INVENTION

Agriculture development has led to an intensive use of chemical fertilizers such as phosphorus, nitrogen and other nutrient sources, thus, increasing water pollution and affecting both compaction and soil structure, and the ecological interactions among soil microbiota. Therefore, one of the main research approaches in the agricultural industry focuses on developing efficient strategies to improve productivity of soils and crops by implementing cost-efficient and ecologically-viable solutions.

It has been found that some interactions between plants and microorganisms have beneficial effects for plant growth; hence, the use of microorganisms in compositions of agricultural application has been widely studied as an alternative to the use of chemically synthesized products. Particularly, microorganisms such as: *Azotobacter* spp., *Flavobacterium* spp., *Acetobacter* spp., *Azospirillum* spp., *Rhizobium* spp., *Klebsiella* spp., *Pseudomonas* spp., *Enterobacter* spp., *Serratia* spp., *Lactobacillus* spp., and *Bacillus* spp., are commonly known as plant growth promoters and can be grouped under different functional groups according to the nutrients they provide to the soil or the benefits delivered to the growth of plants, for example nitrogen fixation, solubilization and mobilization of nutrients, synthesis of plant growth regulators, and production of siderophores.

The development of biofertilizers has commonly focused on employing consortia that supplement nutrient availability separately, e.g. solely providing nitrogen or phosphorus, but the same do not effectively integrate different beneficial bacterial functional groups in order to promote plant growth. That is, although there are biofertilizers including indole-derivative-producing microorganisms, phosphorus solubilizers or nitrogen fixing bacteria separately, there are limited examples in the art of biofertilizers focusing on providing viable consortia that effectively combine different functional groups of plant-growth-promoting microorganisms. As such, existing biofertilizers have a limited effect in reducing the employment of chemically synthesized products in fertilization, since they focus on providing a single nutrient or type of molecules that stimulate plant growth, but do not integrally supplement the main nutritional needs of plants.

Despite many authors have assessed the use of beneficial microorganisms to promote plant growth; the development of biofertilizers faces several technical problems regarding production costs and product's quality. Likewise, biofertilizer formulations require additional ingredients and carriers to extend product's shelf life and to guarantee microbial stability, which are products commonly derived from non-biodegradable sources. Additionally, the use of microbial consortia entails technical challenges such as mitigating the rapid reduction of bacterial populations once the consortium is applied to a substrate, seeking to maintain a viable cell count that is effective in promoting plant growth over prolonged periods of time.

Based on the above, it is identified in the art the need to develop a biofertilizer and biostimulant inoculant that enables the reduction and/or replacement of chemically-synthesized fertilizers, with low-cost production and biodegradable ingredients. Similarly, it is evidenced the need for a biofertilizer that groups different functional groups of bacteria with beneficial interactions for plant growth, such as nitrogen fixation, nutrient solubilization, and siderophores production; wherein the medium used in the bioinoculant or product allows to maintain a significant cellular count of the consortium employed, in order to guarantee the plant-growth-promoting activity of the bioinoculant or product and ensure longer shelf life.

BRIEF DESCRIPTION OF THE INVENTION

The present invention relates to a *Solanum tuberosum*-based biostimulant and biofertilizer bioinoculant composition for agricultural application, which serves as a medium for a bacterial consortium. Said bacterial consortium includes at least one phosphorus-solubilizing strain, at least one siderophore-producing strain, at least one indole-derivative-producing strain, and at least one nitrogen-fixing strain; wherein the composition includes at least one carbon source and one or more indole derivatives.

The invention further relates to a method for producing the bioinoculant composition disclosed herein, which includes the steps of: preparing a *Solanum tuberosum*-based culture medium, that comprises *Solanum tuberosum*, at least one carbon source and one or more indole derivative precursors; inoculating the medium with at least one bacterial consortium which comprises at least one phosphorus-solubilizing strain, at least one siderophore-producing strain, at least one indole-derivative-producing strain and at least one nitrogen-fixing strain; and incubating the *Solanum tuberosum*-based medium until an optimum concentration of one or more indole derivatives is obtained.

Advantageously, the product and the method of the present invention provide an alternative and/or complement to the chemical fertilization of crops, promote plant growth while maintaining stable counts of microbial cells after their application to a substrate or to the plant material and confer extended shelf life.

DETAILED DESCRIPTION OF THE INVENTION

Figure 1:
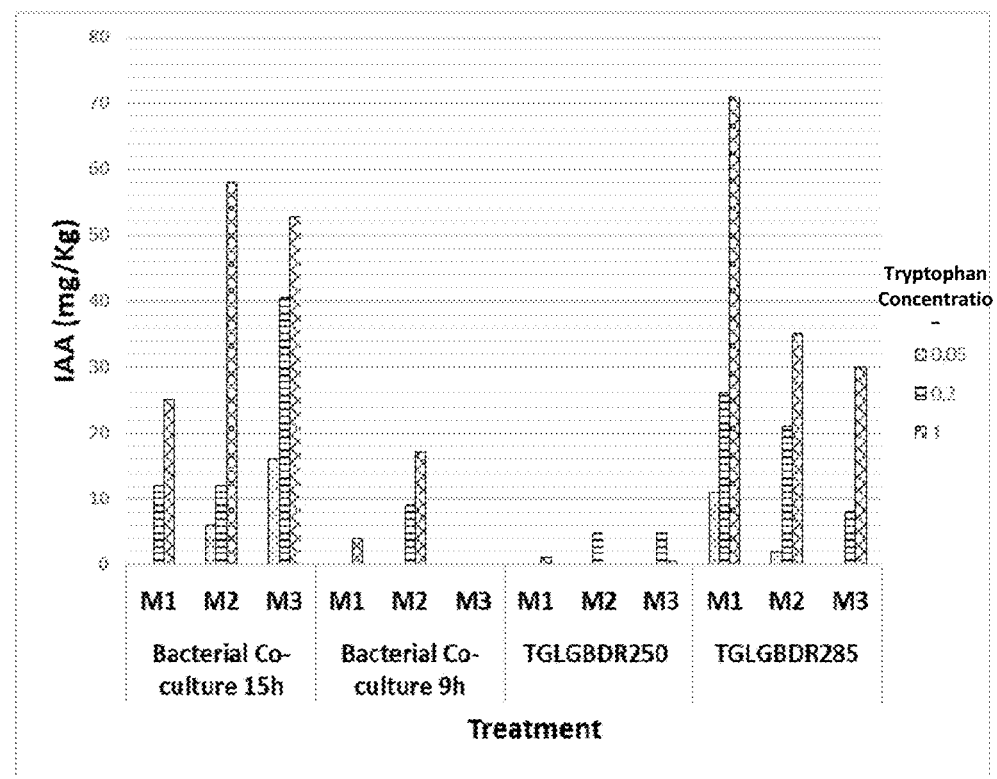
FIG. 1 shows the indole-derivatives-production assay for *Stenotrophomonas* sp. TGLGBDR285 and *Enterobacter* sp. TGLGBDR250 strains in different culture conditions and tryptophan concentrations, wherein the vertical axis corresponds to the concentration of indole acetic acid (IAA).

The present invention relates to a biostimulant and biofertilizer bioinoculant composition for agricultural application which comprises a *Solanum tuberosum*-based medium, at least one carbon source, and at least one consortium of bacterial strains, which comprises at least one phosphorus-solubilizing strain, at least one siderophore-producing strain, at least one indole-derivative-producing strain, and at least one nitrogen-fixing strain.

The composition of the present invention employs a low-cost *Solanum tuberosum*-based medium with a *Solanum tuberosum* concentration of from 10% to 40% w/v of the composition, preferably 20% w/v of the composition.

Additionally, the composition according to the present invention includes a carbon source. Preferably, the carbon source is present in a range of from 0.01% to 5% w/v of the composition, more preferably of from 0.1% and 1% w/v of the composition. According to another preferred embodiment, the carbon source comprises organic compounds, such as sugars. According to a particular embodiment of the invention, the carbon source is selected from the group comprising: malic acid, mannitol, fructose, glycerol, sucrose or combinations thereof. An even more preferred embodiment discloses that the carbon source is sucrose.

The composition herein described further comprises at least one bacterial consortium including at least one phosphorus-solubilizing strain, at least one siderophore-producing strain, at least one indole-derivative-producing strain, and at least one nitrogen-fixing strain. The present invention is also characterized in that the bacterial titer of the consortium is greater than $1 \times 10^4$ CFU/ml, preferably greater than $1 \times 10^8$ CFU/ml.

In one embodiment of the invention, the phosphorus-solubilizing strain corresponds to microorganisms of the genus *Enterobacter*. According to a preferred embodiment, said strain is *Enterobacter* sp. TGLGBDR250.

In another embodiment of the invention, the siderophore-producing strain corresponds to microorganisms of the genus *Enterobacter*. A preferred embodiment discloses that said strain is *Enterobacter* sp. TGLGBDR248.

In at least one embodiment of the invention, the indole-derivative-producing strain corresponds to microorganisms of the genus *Stenotrophomonas*. Preferably, said strain is *Stenotrophomonas* sp. TGLGBDR285.

In a non-limiting embodiment of the invention, the indole-derivative-producing strain corresponds to microorganisms of the genus *Serratia*. According to a preferred embodiment, said strain is *Serratia* sp. TGLGBDR110.

In a particular embodiment of the invention, the bioinoculant composition comprises a consortium wherein the at least one phosphorus-solubilizing strain corresponds to microorganisms of the genus *Enterobacter*, the at least one siderophore-producing strain corresponds to microorganisms of the genus *Enterobacter*, the at least one indole-derivative-producing strain corresponds to microorganisms of the genus *Stenotrophomonas*, and the at least one nitrogen-fixing strain corresponds to microorganisms of the genus *Serratia*.

An even more preferred embodiment discloses that the product of the present invention comprises a consortium, wherein the at least one phosphorus-solubilizing strain is *Enterobacter* sp. TGLGBDR250, the at least one siderophore-producing strain is *Enterobacter* sp. TGLGBDR248, the at least one indole-derivative-producing strain is *Stenotrophomonas* sp. TGLGBR285, and the at least one nitrogen-fixing strain is *Serratia* sp. TGLGBDR110.

It has been identified that the bacterial strains employed within the composition of the present invention are innocuous, non-amylolytic strains. Therefore, the carbon source employed for bacterial growth does not correspond to the starch that *Solanum tuberosum* can provide but rather, to other additional carbon sources. In accordance to the foregoing, the inclusion of a *Solanum tuberosum*-based medium is not intended to provide a carbon source for the consortium strains.

Surprisingly, it was identified that the use of a *Solanum tuberosum*-based medium allows to obtain suitable ranges of indole derivatives under cost-efficient production conditions and favors the yield of indole derivatives under coculture conditions wherein the consortium according to the present invention is used. The foregoing enables the obtention of suitable ranges of indole derivatives that do not exceed a concentration of 0.1% w/v of the composition, preferably 0.0008% and 0.005% w/v of the composition, which is beneficial in a bioinoculant composition taking into account that high concentrations of indole derivatives generate deleterious effects in plants.

Advantageously, the composition herein disclosed generates higher growth indexes evinced in the variables assessed in respect of other treatments such as chemical fertilization or separate strain inoculation of the strains comprised by the consortium according to the present invention.

Furthermore, the present invention can be employed along with a chemical fertilization scheme, reaching higher growth rates than those evidenced by only using chemically synthesized products; thus proving that the revealed consortium allows to reduce the use of chemical fertilizers, while it improves the plant-growth promoting effect thereof. The bacterial consortium related to the present invention is compatible in a non-limiting manner with fertilizers such as NPK, DAP, Sulpomag, Fertigro, Humita, Nutriponic, among others.

The composition according to the instant invention does not require refrigeration and is stable for at least 120 days at temperatures from about 16° C. to about 24° C.

Another embodiment of the present invention relates to a method for fertilizing plants comprising diluting the composition in water and applying it to the substrate or to the plant material.

Another aspect of the invention reveals a method for producing the bioinoculant composition herein described, which comprises the steps of preparing a *Solanum tuberosum*-based medium, inoculating said medium with at least one consortium of bacterial strains, and incubating the same.

The *Solanum tuberosum*-based medium comprises: *Solanum tuberosum*, one or more indole derivative precursors, and at least one carbon source.

According to the present invention, the preparation of the *Solanum tuberosum*-based medium is carried out by introducing *Solanum tuberosum* in water and subjecting it to boiling temperature until it reduces its firmness. The remaining solid waste is removed by filtering the resulting broth. Subsequently, at least one carbon source and the one or more indole derivative precursors are added to the medium in the desired concentration.

According to a preferred embodiment of the present invention, the *Solanum tuberosum*-based medium is prepared in such way that the concentration of *Solanum tuberosum* present in the medium ranges between 10% and 40% w/v of the composition, preferably 20% w/v of the composition.

The present invention is also characterized in that the *Solanum tuberosum*-based medium is prepared in such way that the concentration of the carbon source is found between 0.01% and 5% w/v of the composition. Even more preferably, the carbon concentration ranges between 0.1% and 1% w/v of the composition. According to another preferred embodiment, the carbon source comprises organic compounds, such as sugars. According to a particular embodiment of the invention, the carbon source is selected from the group comprising: malic acid, mannitol, fructose, glycerol, sucrose or combinations thereof. An even more preferred embodiment discloses that the carbon source is sucrose.

Preferably, the *Solanum tuberosum*-based medium according to the method of the present invention is prepared in such way that the concentration of the one or more indole derivative precursors is found between 0.05% and 1% w/v of the composition. In a non-limitative embodiment of the invention, the indole derivative precursor is tryptophan.

After preparing the *Solanum tuberosum*-based medium, the medium is inoculated with a bacterial consortium. According to the present invention, the bacterial consortium comprises at least one phosphorus-solubilizing strain, at least one siderophore-producing strain, at least one indole-derivative-producing strain, and at least one nitrogen-fixing strain.

In one embodiment of the invention, the phosphorus-solubilizing strain corresponds to microorganisms of the genus *Enterobacter*. According to a preferred embodiment, said strain is *Enterobacter* sp. TGLGBDR250.

In another embodiment of the invention, the siderophore-producing strain corresponds to microorganisms of the genus *Enterobacter*. A preferred embodiment discloses that said strain is *Enterobacter* sp. TGLGBDR248.

In at least one embodiment of the invention, the indole-derivative-producing strain corresponds to microorganisms of the genus *Stenotrophomonas*. Preferably, said strain is *Stenotrophomonas* sp. TGLGBDR285.

In a non-limiting embodiment of the invention, the nitrogen-fixing strain corresponds to microorganisms of the genus *Serratia*. Preferably, said strain is *Serratia* sp. TGLGBDR110. According to an embodiment of the invention, the bioinoculant composition comprises a consortium wherein the at least one phosphorus-solubilizing strain corresponds to microorganisms of the genus *Enterobacter*, the at least one siderophore-producing strain corresponds to microorganisms of the genus *Enterobacter*, the at least one indole-derivative-producing strain corresponds to microorganisms of the genus *Stenotrophomonas*, and the at least one nitrogen-fixing strain corresponds to microorganisms of the genus *Serratia*.

An even more preferred embodiment discloses that the product of the present invention comprises a consortium, wherein the at least one phosphorus-solubilizing strain is *Enterobacter* sp. TGLGBDR250, the at least one siderophore-producing strain is *Enterobacter* sp. TGLGBDR248, the at least one indole-derivative-producing strain is *Stenotrophomonas* sp. TGLGBDR285, and the at least one nitrogen-fixing strain is *Serratia* sp. TGLGBDR110.

Subsequently, the inoculated medium is incubated until a maximum concentration of 0.1% w/v of one or more indole derivatives is obtained and a bacterial titer greater than $10^4$ CFU/ml, preferably greater than $10^8$ CFU/ml, is reached. According to one embodiment of the invention, the medium is incubated until a concentration of indole derivatives between 0.0008% to 0.005% w/v of the composition is obtained. A preferred embodiment of the method discloses that the incubation step is carried out for at least 6 hours, preferably for 7 to 17 hours, and even more preferably for 9 to 15 hours. Additionally, the incubation step of the method disclosed herein is carried out at a temperature of from 20° C. to 40° C., preferably at 30° C.±4° C.

The present invention will be exemplified in a non-limiting manner by the particular embodiments below.

Examples

1. Innocuity Assessment of the Selected Strains on *Caenorhabditis elegans* Biological Model.

Innocuity assessment of the selected strains were carried on the *Caenorhabditis elegans* biological model, showing that the strains evaluated do not have a pathogenic effect on the nematode. Mortality percentages evinced in the bacterial treatment are similar to that obtained in the negative control, as shown in Table 1 below.

TABLE 1

Innocuity assessment of the selected strains on *Caenorhabditis elegans*, wherein it is shown that the mortality percentages of the biological model in presence of the selected strains are similar to the values shown in the control treatment.

| Bacterial strain | Percentage of nematode mortality after 96 h |
| --- | --- |
| *E. coli* OP50 (negative control) | 13% |
| *Pseudomonas aeruginosa* (positive control) | 90% |
| *Enterobacter* sp. TGLGBDR250 | 19.8% |
| *Enterobacter* sp. TGLGBDR248 | 16.5% |
| *Serratia* sp. TGLGBDR110 | 23% |

2. Qualitative Evaluation of the Amylolytic Activity of the Strains and the Consortium Pure bacterial colonies of the selected strains were inoculated in potato agar (solid) without additional carbon sources, showing that none of them has amylolytic activity. The qualitative indicator of the presence of amylolytic activity was the formation of a hydrolysis halo of the starch around the colonies. None of the selected strains presented said hydrolysis halo.

TABLE 2

Qualitative evaluation of amylolytic activity of the strains and the consortium seeded on potato agar without additional carbon sources.

| Strain/Product | Growth | Amylolytic activity |
| --- | --- | --- |
| *Enterobacter* sp. TGLGBDR248 | Presents growth | No hydrolysis halos were |

TABLE 2-continued

Qualitative evaluation of amylolytic activity of the strains and the consortium seeded on potato agar without additional carbon sources.

| Strain/Product | Growth | Amylolytic activity |
|---|---|---|
| Enterobacter sp. TGLGBDR250 | Presents growth | No hydrolysis halos were observed |
| Serratia sp. TGLGBDR110 | Presents growth | No hydrolysis halos were observed |
| Stenotrophomonas sp. TGLGBDR285 | Presents growth | No hydrolysis halos were observed |
| Consortium | Presents growth | No hydrolysis halos were observed |

The above shows that the selected strains do not have amylolytic activity, that is, they do not use starch as a carbon source.

3. Evaluation of *Solanum tuberosum*-Sucrose-Tryptophan Medium and the Medium Supplemented with Soy and Yeast on the Production of Indole Derivatives in Indole Acetic Acid-Producing *Stenotrophomonas* sp. TGLGBDR285 and *Enterobacter* sp. TGLGBDR250 Strains.

The selected microorganisms were grown independently according to their growth kinetics (9 hours at 30° C. and 120 rpm for the *Enterobacter* sp. TGLGBDR250 strain, and 15 hours at 30° C. and 120 rpm for the *Stenotrophomonas* sp. TGLGBDR285 strain) and in a coculture of 9 hours and 15 hours. The culture media evaluated were:

M1: Nutrient Broth
M2: *Solanum tuberosum* broth 20% w/v+sucrose 0.25% w/v of the composition
M3: *Solanum tuberosum* broth+soy+yeast to which three different concentrations of an indole precursor, tryptophan, were added to evaluate the production of indole derivatives.

FIG. 1 shows that the production of indole derivatives is greater for the *Stenotrophomonas* sp. TGLGBDR285 strain in nutrient broth, and for the bacterial coculture in both M2 and M3 after 15 hours of incubation. Considering that a method to produce a composition should be carried upon the most cost-efficient conditions, the *Solanum tuberosum* broth 20% w/v+sucrose 0.25% w/v+Trp 0.2% w/v of the composition was selected as medium, bearing in mind that a culture incubation time of 9 hours in said medium allows reaching a bacterial titer greater than $10^8$ CFU/ml, and that said medium enables the production of a suitable concentration range for the indole derivatives with a relatively low concentration of tryptophan as an indole derivative precursor.

In addition, FIG. 1 shows that at nine hours the coculture in the *Solanum tuberosum* broth medium 20% w/v+sucrose 0.25% w/v+Trp 0.2% w/v of the composition presents an ideal initial concentration of indole derivatives that does not exceed the 10 ppm, which does not happen using the same tryptophan concentration in M1 and M2 media.

Additionally, the concentration of indole derivatives after 9 hours of incubation is present in the medium in such a range that said concentration does not exceed 0.1% w/v of the composition at the end of its shelf life, which is relevant for the formulation and application of the composition, as it has been shown that a high concentration of indole derivatives entails deleterious effects for plants. The foregoing indicates that only the medium disclosed by the present invention promotes the production of indole derivatives in the shortest incubation time, employing cost-effective concentrations of tryptophan, which is a high-cost reagent.

4. Selecting the Culture Medium for the Consortium Based on the Production of Indole Derivatives: Evaluation of *Solanum tuberosum*-Sucrose-Tryptophan Broth Vs. Nutrient Broth The production of indole derivatives by *Stenotrophomonas* sp. TGLGBDR285, *Enterobacter* sp. TGLGBDR250 strains, separately, and by the consortium selected was assessed in two different media: commercial nutrient broth (Difco brand) and *Solanum tuberosum* broth 20% w/v+sucrose 0.25%+Trp 0.2% of the composition.

Figure 2:
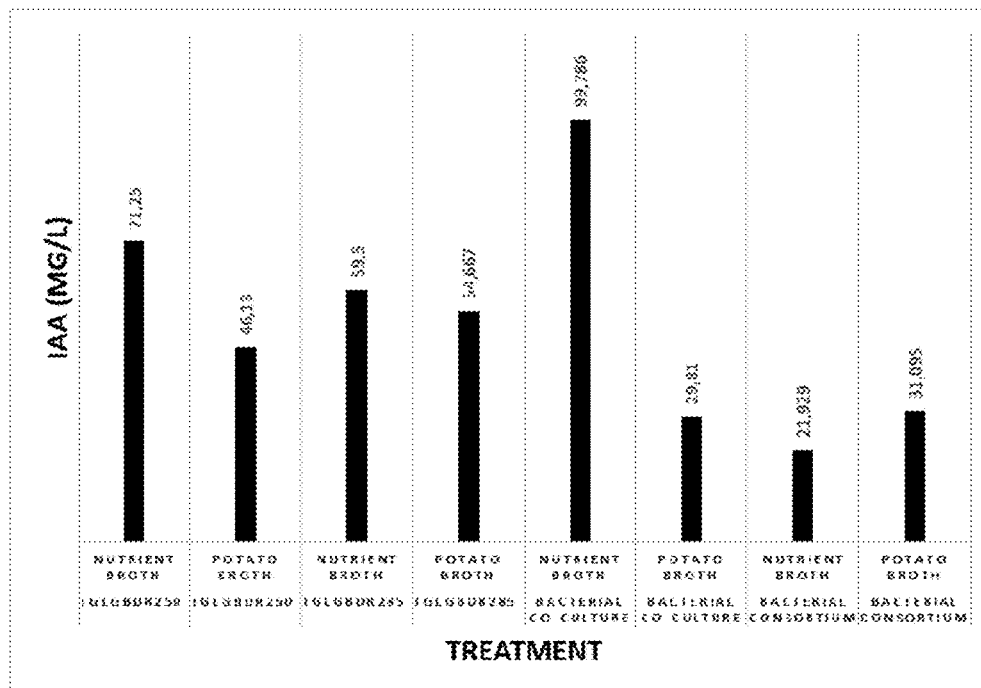
FIG. 2 shows the indole-derivatives-production assay in different culture media for *Stenotrophomonas* sp. TGLGBDR285, *Enterobacter* sp. TGLGBDR250 strains, and the consortium selected, wherein the vertical axis corresponds to the concentration of indole acetic acid (IAA).

FIG. 2 shows that *Stenotrophomonas* sp. TGLGBDR285 and *Enterobacter* sp. TGLGBDR250 strains produce more indole derivatives separately and in coculture in the commercial nutrient broth. However, when the production of indole derivatives of the selected consortium was evaluated, the production of compounds of interest in the nutrient broth decreased below the concentration of indole acetic acid observed in the *Solanum tuberosum* medium according to the present invention. This evidences that said medium promotes a stable yield in the production of indole derivatives in the presence of the entire consortium.

5. Corn Inoculation Test Under Greenhouse Conditions.

The effect of the inoculation of strains conforming the consortium (*Enterobacter* sp. TGLGBDR250, *Enterobacter* sp. TGLGBDR248, *Stenotrophomonas* sp. TGLGBDR285 and *Serratia* sp. TGLGBDR110) was evaluated, in a fresh consortium and in two batches of 24 months-old product and 8 months-old product.

The inoculation test with plant-growth-promoting bacteria was established with corn seeds under greenhouse conditions. The sowing substrate was a quartzitic sand-soil mixture in a 1:1 ratio. NPK was applied as a fertilization control, and control treatments were only watered with tap water. The evaluation was carried out 60 days after sowing.

The test was carried out under a randomized block design in 4 blocks, 9 treatments, and 4 replicas per treatment. Each product was diluted in three water parts and 10 ml inoculant was applied per plant. Evaluated variables were: shoot and root fresh weight, and root length.

Figure 3:
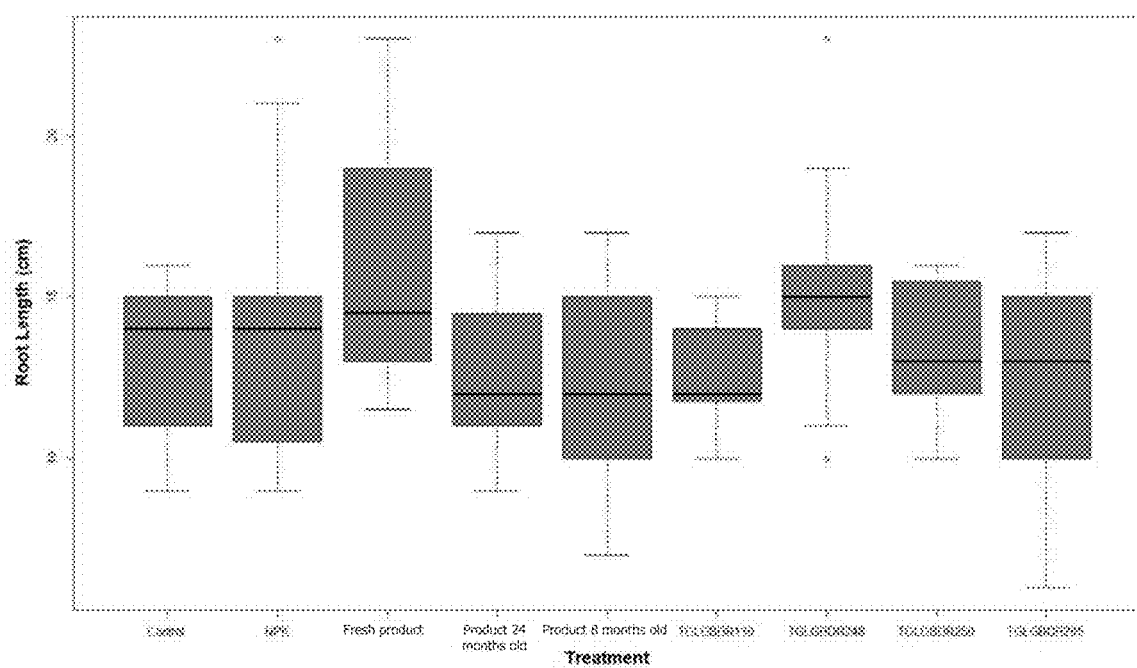
FIG. 3 indicates the root length of corn plants 60 days after being treated with chemical fertilizers, pure strains of the consortium separately, or, different batches of the composition, under greenhouse conditions.

FIG. 3 shows the data of root length. ANOVA showed statistically significant differences between treatments (p=0.01848). High variation exhibited in said variable shows an increasing tendency in the roots length when plants are exposed to the composition of the present invention.

Figure 4:
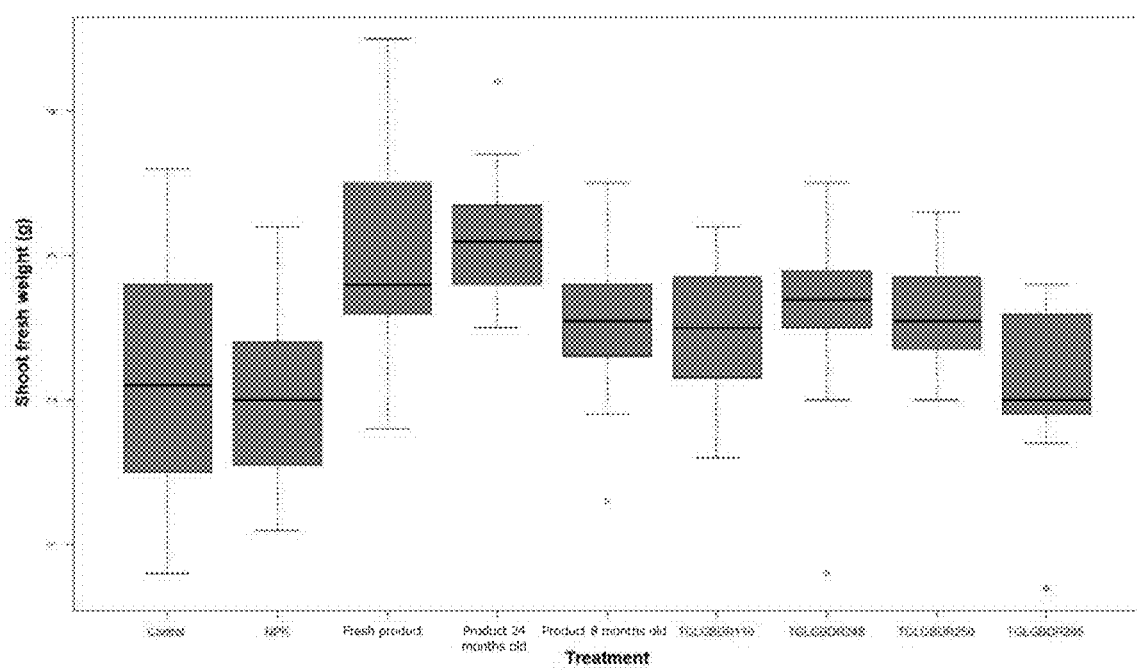
FIG. 4 shows the shoot fresh weight in corn plants 60 days after being treated with chemical fertilizers, pure strains of the consortium separately, or, different batches of the composition, under greenhouse conditions.
Figure 5:
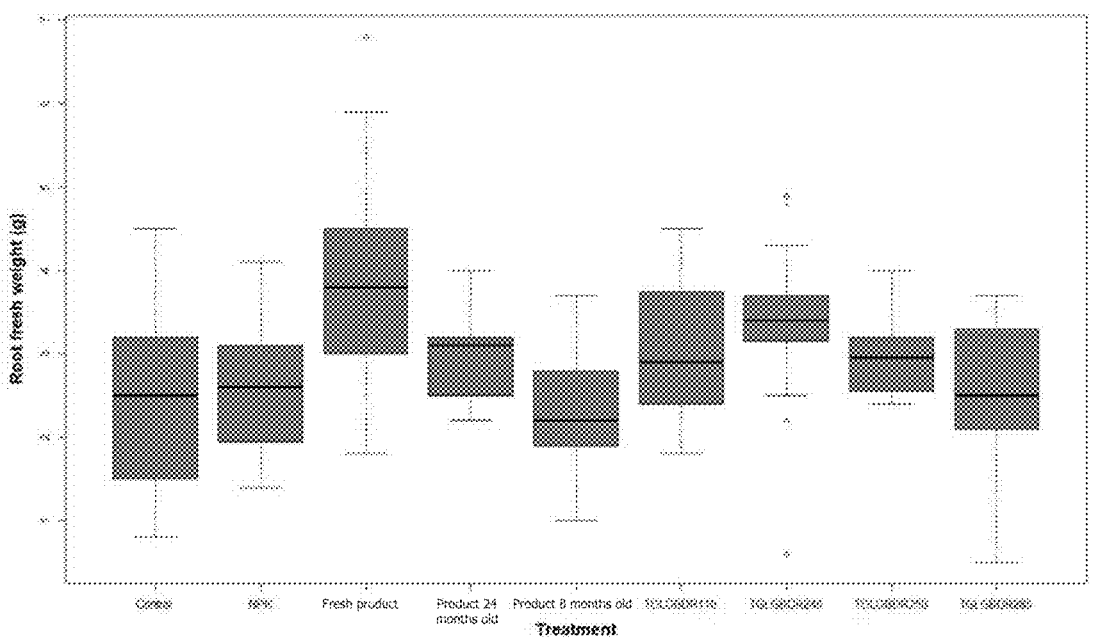
FIG. 5 shows root fresh weight in corn plants 60 days after being treated with chemical fertilizers, pure strains of the consortium separately, or, different batches of the composition, under greenhouse conditions.

FIGS. 4 and 5 show the data of shoot fresh weight (SFW) and root fresh weight (RFW), wherein plants inoculated with the fresh product according to the present invention had the highest growth. There were significant differences between treatments for SFW and RFW (w=1.893e-05, w=0.0005928, respectively).

The behavior of evaluated variable growth was better in all cases when the product is used in commercial formulation.

6. Bacterial Concentrate Effect of Pure Cultures and Combinations of Consortium Strains, Resuspended in Phosphate Buffered Saline on *Pinus caribaea* Plants.

The consortium of the present invention can be formulated in addition with chemical fertilizers. In order to evaluate the activity of the selected consortium in the present invention and strains thereof, in presence of chemical fertilizers, a randomized complete block test was designed with 4 blocks, 10 treatments, and 10 replicates per treatment.

Treatments
T1. TGLGBDR250 Bacteria+Fertilization 75%
T2. TGLGBDR285 Bacteria+Fertilization 75%
T3. TGLGBDR248 Bacteria+Fertilization 75%
T4. TGLGBDR110 Bacteria+Fertilization 75% was inoculated with 10 ml inoculum at a concentration of $10^8$ CFU/ml according to the treatment. Four control treatments without bacterial inoculation were established, corresponding to two levels of fertilization and the presence of PBS. The same amount as in the bacterial inoculum was added for the PBS controls.

TABLE 4

Nutritional contributions of chemical fertilizations from the inoculation test in *Pinus caribaea* under greenhouse conditions

| Nutrients (mg/plant) | Application 1 | | Application 2 | | Application 3 | | Application 4 | |
|---|---|---|---|---|---|---|---|---|
| | 100% | 75% | 100% | 75% | 100% | 75% | 100% | 75% |
| N Total | 0.3240 | 0.2430 | 0.6480 | 0.4860 | 0.9720 | 0.7290 | 1.2960 | 0.9720 |
| $P_2O_5$ | 0.8280 | 0.6210 | 1.6560 | 1.2420 | 2.4840 | 1.8630 | 3.3120 | 2.4840 |
| $K_2O$ | 0.4500 | 0.3375 | 0.9000 | 0.6750 | 1.3500 | 1.0125 | 1.8000 | 1.3500 |
| $Mg^{++}$ | 0.3600 | 0.2700 | 0.7200 | 0.5400 | 1.0800 | 0.8100 | 1.4400 | 1.0800 |
| S | 0.4230 | 0.3173 | 0.8460 | 0.6345 | 1.2690 | 0.9518 | 1.6920 | 1.2690 |
| $Cl^-$ | 0.0450 | 0.0338 | 0.0900 | 0.0675 | 0.1350 | 0.1013 | 0.1800 | 0.1350 |
| $Ca^{++}$ | 0.2520 | 0.1890 | 0.5040 | 0.3780 | 0.7560 | 0.5670 | 1.0080 | 0.7560 |
| $B^{+++}$ | 0.0036 | 0.0027 | 0.0072 | 0.0054 | 0.0108 | 0.0081 | 0.0144 | 0.0108 |
| $Cu^{++}$ | 0.0054 | 0.0041 | 0.0108 | 0.0081 | 0.0162 | 0.0122 | 0.0216 | 0.0162 |
| $Fe^{++}$ | 0.0090 | 0.0068 | 0.0180 | 0.0135 | 0.0270 | 0.0203 | 0.0360 | 0.0270 |
| $Mn^{++}$ | 0.0144 | 0.0108 | 0.0288 | 0.0216 | 0.0432 | 0.0324 | 0.0576 | 0.0432 |
| $Mo^{+6}$ | 0.0007 | 0.0005 | 0.0014 | 0.0011 | 0.0022 | 0.0016 | 0.0029 | 0.0022 |
| $Zn^{++}$ | 0.0117 | 0.0088 | 0.0234 | 0.0176 | 0.0351 | 0.0263 | 0.0468 | 0.0351 |
| Electric conductivity (dS $m^{-1}$) | 1.96 | 1.64 | 3.19 | 2.47 | 4.61 | 3.89 | 4.27 | 3.67 |
| Osmotic potential (MPa) | −0.071 | −0.059 | −0.115 | −0.089 | −0.166 | −0.140 | −0.154 | −0.132 |
| pH solution | 7.46 | 7.5 | 7.18 | 7.28 | 6.68 | 6.77 | 6.91 | 6.87 |
| Total (mg/plant) | 2.73 | 2.05 | 5.45 | 4.09 | 8.18 | 6.14 | 10.91 | 8.18 |

T5. TGLGBDR250 Bacteria+TGLGBDR 285+Fertilization 75%
T6. TGLGBDR250 Bacteria+TGLGBDR285+TGLGBDR248+TGLGBDR110+Fertilization 75%
T7. Without Bacteria+Fertilization 75%
T8. Without Bacteria+Fertilization 100%
T9. Without Bacteria+Fertilization 75%+PBS
T10. Without Bacteria+Fertilization 100%+PBS Each of the bacterial strains to be evaluated were sown in nutrient broth. Bacterial cultures were centrifuged at 8000 rpm for 15 minutes at 4° C. Three washes of the pellet were carried out with saline solution 0.85%, and the aforementioned conditions were centrifuged in each of the washes.

Bacterial concentrate obtained was diluted in 400 ml of phosphate buffered saline (PBS) 0.2M pH 7 solution (2.7218 g/100 ml $KH_2PO_4$, 3.484 g/100 ml $K_2HPO_4$, ratio 1:1). The final concentration of each of the inoculants was determined by Neubauer chamber counting (Table 3).

TABLE 3

Bacterial inoculant concentration used for inoculation test in *Pinus caribaea* plants.

| INOCULUM | CFU/ml |
|---|---|
| TGLGBDR250 | $2.3 \times 10^8$ |
| TGLGBDR285 | $3.6 \times 10^8$ |
| TGLGBDR248 | $1.7 \times 10^8$ |
| TGLGBDR110 | $5.3 \times 10^8$ |
| TGLGBDR250 + TGLGBDR285 | $6.9 \times 10^8$ |
| Consortium | $6.4 \times 10^8$ |

Figure 6:
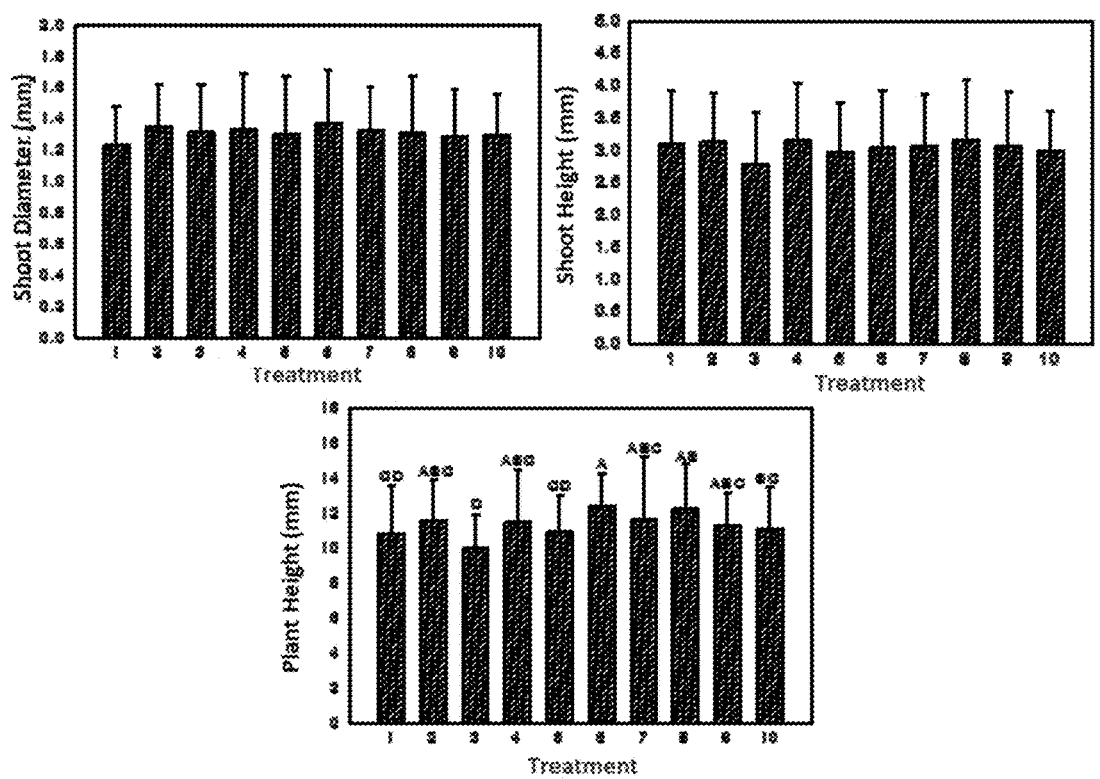
FIG. 6 shows growth indicators of *Pinus caribaea* plants 60 days after being treated with different chemical and biological fertilization treatments.

*Pinus caribaea* plants obtained from seeds 21 days after sowing were used in 10 cm×4 cm black polypropylene bags (one plant per bag) with 100 g capacity of sowing substrate (bark of the same ground and composted pine). Each plant There were significant differences (p=0.0016) between them on the height of plants sixty days after the application of the treatments (FIG. 6).

According to the Duncan test, the inoculation of the mixture of the four bacterial strains with 75% of chemical fertilization (T6) and 100% of fertilization level without the bacterial inoculation (T8) (positive control) presented the highest response for this variable, with average values of 12.4+1.8 cm, and 12.2+2.5 cm, respectively.

Figure 7:
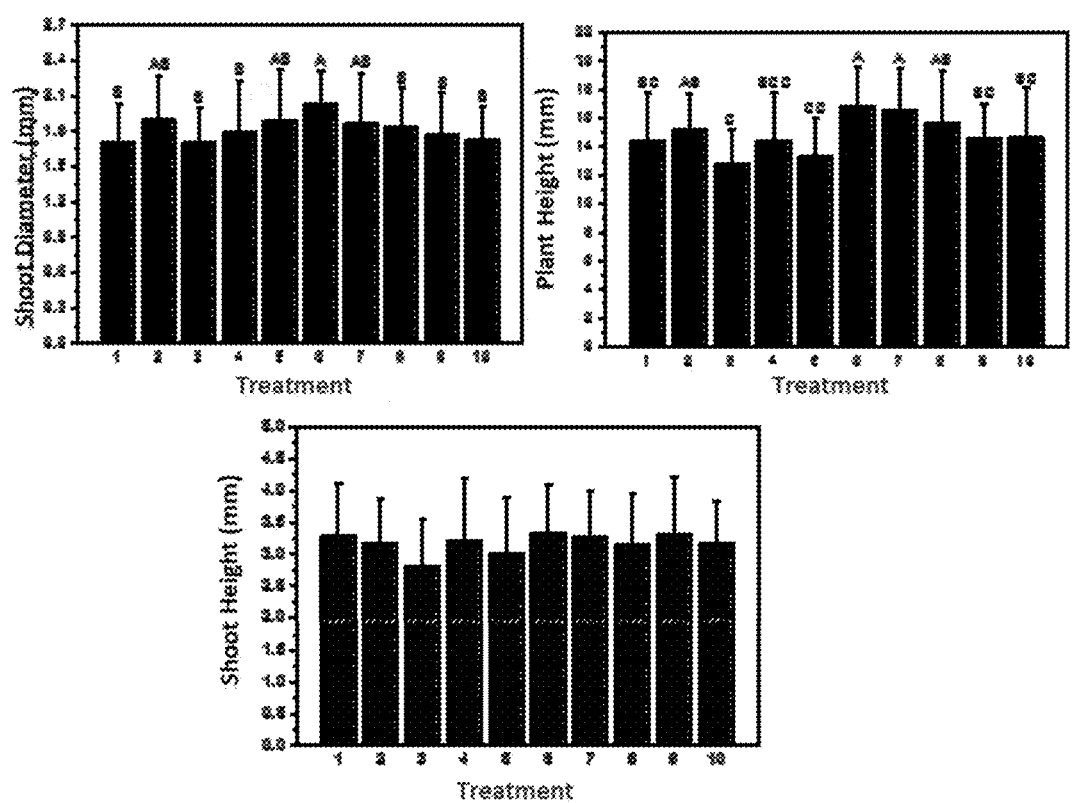
FIG. 7 shows growth indicators of *Pinus caribaea* plants 90 days after being treated with different chemical and biological fertilization treatments.

There were significant differences between treatments for shoot diameter (p=0.0017), and for plant height (p=0.0000) in *Pinus caribaea* 90 days after the application (FIG. 7). According to the Duncan test, the inoculation of the mixture of four bacterial strains with 75% of chemical fertilization (T6), presented the highest response for these variables, with average values of 2.03+0.28 mm, and 16.8+2.8 cm, respectively.

Figure 8:
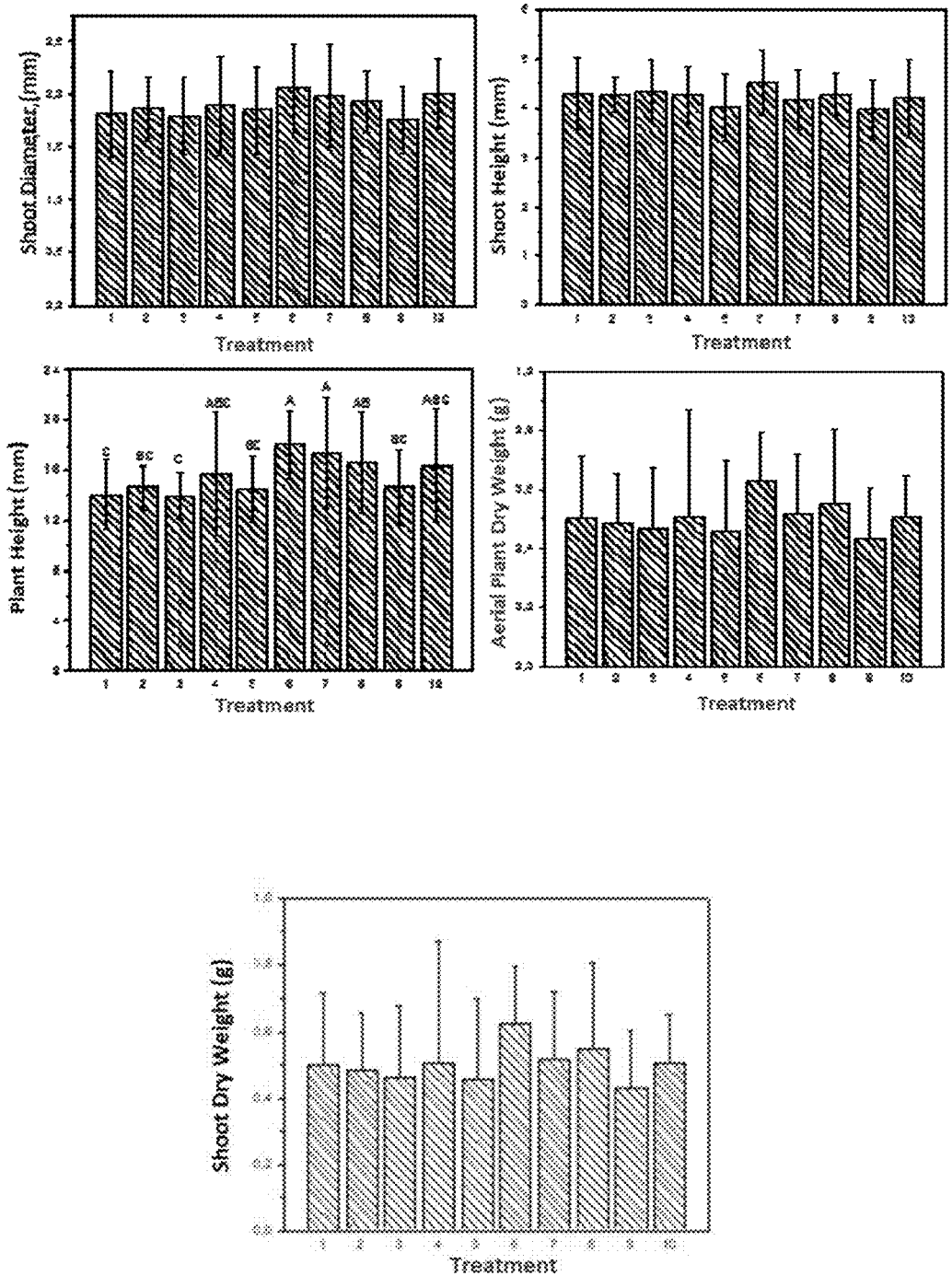
FIG. 8 shows growth indicators of *Pinus caribaea* plants 120 days after sowing with different chemical and biological fertilization treatments.

After 120 days from sowing (FIG. 8), and at the time of transplantation to the final plot, the general assessment of the test was made. The height of the plant presented significant statistical differences between treatments (p=0.005).

For all the variables of the aerial part of the plant, the treatment 6 that corresponds to the inoculation of the bacterial consortium presented the greatest response, with an average value for the height of the plant of 18.1+2.7 cm. The inoculation with a siderophore-producing bacterial strain TGLGBDR248 (T3), presented the least response for the variables shoot diameter and height of the plant, with an average value for the height of the plant of 13.9+1.9 cm (FIG. 7).

Root Growth

According to ANOVA, there were no significant differences between treatments for root length (w=0.1136), nor for root dry weight (w=0.9989) of *Pinus caribaea* plants. However, the treatment 1 corresponding to the inoculation of phosphorus-solubilizing TGLGBDR250 strain with 75% of the chemical fertilization generated the greatest response for these variables, with average values of 27.8+12.5 cm and 0.13+0.07 g, respectively.

Foliar Phosphorus

For the foliar phosphorus content, the Duncan test generated three homogenous groups within evaluated treatments, being the inoculation with nitrogen-fixing bacterial strain TGLGBDR110 and the coculture of TGLGBDR250+ TGLGBDR285 strains the treatments that presented a greater response in the accumulation of phosphorus in the foliar tissues of *Pinus caribaea* plants, with average values of 0.25±0.08% and 0.24±0.07%, respectively. The treatment 7 corresponding to 75% of chemical fertilization without bacterial inoculant presented the lowest response to this variable with an average value of 0.17+0.04%.

According to the foregoing, the composition according to the present invention allows to reduce the use of chemical synthesis products achieving growth indicators similar or greater to the ones obtained by employing chemical fertilization treatments.

The invention claimed is:

1. A biostimulant and biofertilizer bioinoculant composition for agricultural applications comprising:
   a *Solanum tuberosum*-based medium
   at least one consortium of bacterial strains comprising:
      at least one phosphorus-solubilizing strain;
      at least one siderophore-producing strain;
      at least one indole-derivative-producing strain; and
      at least one nitrogen-fixing strain;
         wherein the bacterial titer is greater than $1 \times 10^4$ CFU/ml; and
   one or more indole derivatives in a maximum concentration of 0.1% w/v of the composition,
   wherein the biostimulant and biofertilizer bioinoculant composition is obtained by inoculating the *Solanum tuberosum*-based medium with the at least one consortium of bacterial strains, and
   incubating the *Solanum tuberosum*-based medium initially comprising *Solanum tuberosum* in a concentration of from 10% to 40% w/v of the composition, at least a carbon source in a concentration of from 0.01% to 5% w/v of the composition, and tryptophan in a concentration of from 0.05% to 1% w/v.

2. The bioinoculant composition according to claim 1, wherein the at least one phosphorus-solubilizing strain corresponds to *Enterobacter* sp. TGLGBDR250; the at least one siderophore-producing strain corresponds to *Enterobacter* sp. TGLGBDR248; the at least one indole-derivative-producing strain corresponds to *Stenotrophomonas* sp. TGLGBDR285; and the at least one nitrogen-fixing strain corresponds to *Serratia* sp. TGLGBDR110.

3. The bioinoculant composition according to claim 2, wherein the one or more indole derivatives are present in a concentration of from 0.0008% to 0.005% w/v of the composition.

4. The bioinoculant composition according to claim 1, wherein the carbon source is selected from the group consisting of malic acid, mannitol, fructose, glycerol, sucrose or combinations thereof.

5. The bioinoculant composition according to claim 1, wherein the at least one phosphorus-solubilizing strain corresponds to microorganisms of the genus *Enterobacter*, the at least one siderophore-producing strain corresponds to microorganisms of the genus *Enterobacter*; the at least one indole-derivative-producing strain corresponds to microorganisms of the genus *Stenotrophomonas*, and the at least one nitrogen-fixing strain corresponds to microorganisms of the genus *Serratia*.

6. The bioinoculant composition according to claim 1, wherein the at least one siderophore-producing strain corresponds to *Enterobacter* sp. TGLGBDR248.

7. The bioinoculant composition according to claim 1, wherein the at least one indole-derivative-producing strain corresponds to *Stenotrophomonas* sp. TGLGBDR285.

8. The bioinoculant composition according claim 1, wherein the at least one nitrogen-fixing strain corresponds to *Serratia* sp. TGLGBDR110.

9. The bioinoculant composition according to claim 1, wherein the one or more indole derivatives are present in a concentration of from 0.0008% to 0.005% w/v of the composition.

10. A method for producing a biostimulant and biofertilizer bioinoculant composition for agricultural application comprising the steps of:
    preparing a *Solanum tuberosum*-based medium comprising:
       *Solanum tuberosum* in a concentration of from 10% to 40% w/v of the composition;
       at least one carbon source in a concentration of from 0.01% to 5% w/v of the composition; and
       tryptophan in a concentration of from 0.05% to 1% w/v;
    inoculating the medium with at least one consortium of bacterial strains comprising:
       at least one phosphorus-solubilizing strain,
       at least one siderophore-producing strain;
       at least one indole-derivative-producing strain; and
       at least one nitrogen-fixing strain;
    incubating the *Solanum tuberosum*-based medium;
    wherein the step of incubating *Solanum tuberosum*-based medium is carried out until a maximum concentration of 0.1% w/v of one or more indole derivatives and a bacterial titer greater than $10^4$ CFU/ml is obtained.

11. The method for producing a bioinoculant composition according to claim 10, wherein the carbon source is added in a concentration of from 0.01% to 1% w/v of the composition.

12. The method for producing a bioinoculant composition according to claim 10, wherein the carbon source is selected from the group consisting of malic acid, mannitol, fructose, glycerol, sucrose or combinations thereof.

13. The method for producing a bioinoculant composition according to claim 10, wherein the at least one phosphorus-solubilizing strain corresponds to microorganisms of the genus *Enterobacter*, the at least one siderophore-producing strain corresponds to microorganisms of the genus *Enterobacter*, the at least one indole-derivative-producing strain corresponds to microorganisms of the genus *Stenotrophomonas*; and the at least one nitrogen-fixing strain corresponds to microorganisms of the genus *Serratia*.

14. The method for producing a bioinoculant composition according to claim 10, wherein the at least one siderophore-producing strain corresponds to *Enterobacter* sp. TGLGBDR248.

15. The method for producing a bioinoculant composition according to claim 10, wherein the at least one indole-derivative-producing strain corresponds to *Stenotrophomonas* sp. TGLGBDR285.

16. The method for producing a bioinoculant composition according to claim 10, wherein the at least one nitrogen-fixing strain corresponds to *Serratia* sp. TGLGBDR110.

17. The method for producing a bioinoculant composition according to claim 10, wherein the at least one phosphorus-solubilizing strain corresponds to *Enterobacter* sp. TGLGBDR250; the at least one siderophore-producing strain corresponds to *Enterobacter* sp. TGLGBDR248; the at least one indole-derivative-producing strain corresponds to *Stenotrophomonas* sp. TGLGBDR285; and the at least one nitrogen-fixing strain corresponds to *Serratia* sp. TGLGBDR110.

18. The method for producing a bioinoculant composition according to claim 10, wherein the inoculated medium is incubated for at least 6 hours.

19. The bioinoculant composition according to claim 1, wherein at least one phosphorus-solubilizing strain corresponds to *Enterobacter* sp. TGLGBDR250.

20. The method for producing a bioinoculant composition according to claim 10, wherein at least one phosphorus-solubilizing strain corresponds to *Enterobacter* sp. TGLGBDR250.

* * * * *